Nov. 7, 1967  J. N. ANDREWS ET AL  3,350,908
TUBE BEADING MACHINE

Filed April 19, 1965  5 Sheets-Sheet 4

INVENTORS
JULIAN N. ANDREWS
HARRY C. GERSBACHER

BY J E Beringer

Their ATTORNEY

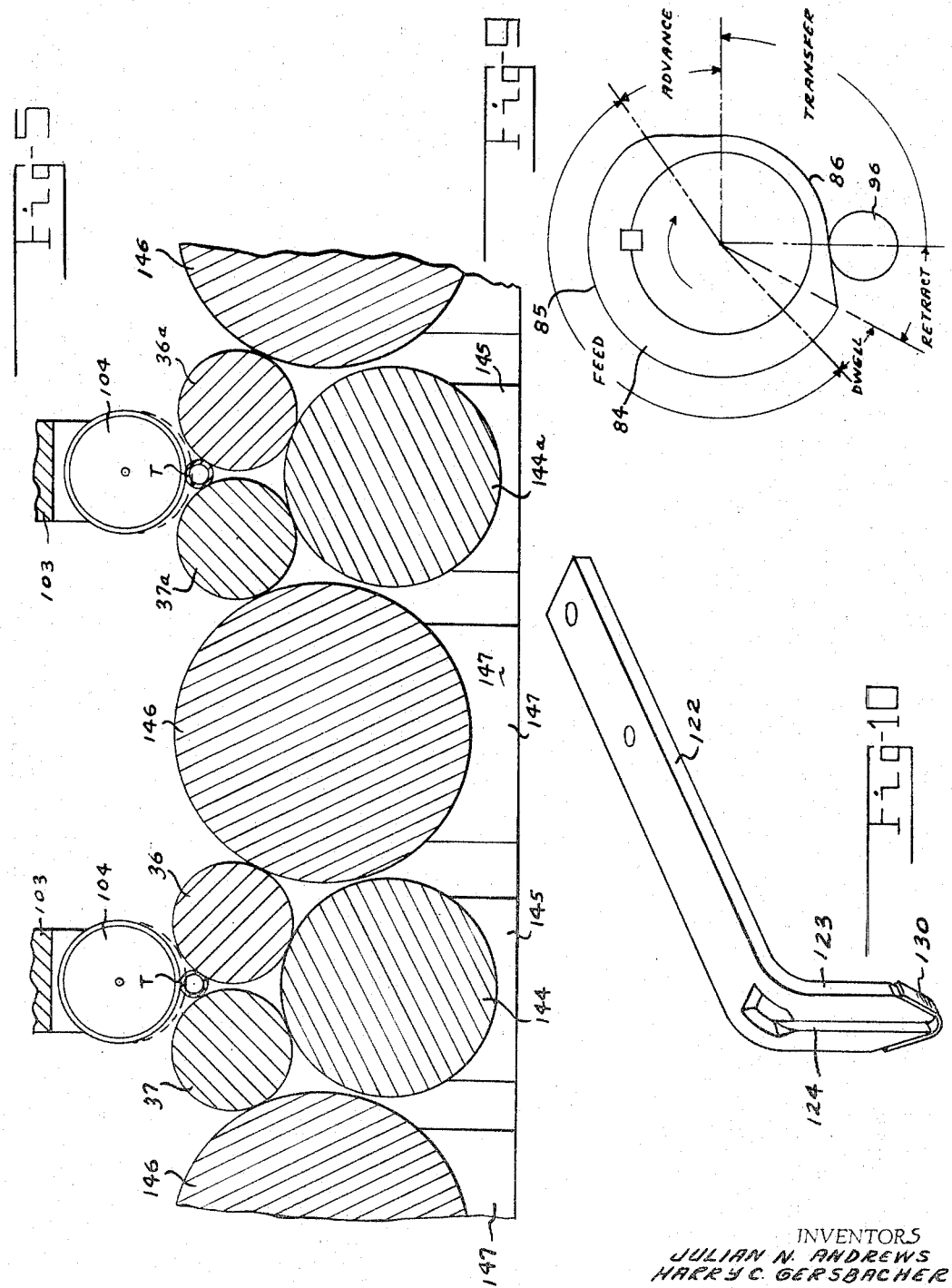

3,350,908
TUBE BEADING MACHINE
Julian N. Andrews, Los Angeles, Calif., and Harry C. Gersbacher, Dayton, Ohio, assignors to United Aircraft Products, Inc., Dayton, Ohio, a corporation of Ohio
Filed Apr. 19, 1965, Ser. No. 448,970
15 Claims. (Cl. 72—102)

ABSTRACT OF THE DISCLOSURE

A machine forming longitudinally spaced apart circumferential grooves in a cylindrical heat exchange or like tube, the machine defining a series of tube beading stations to which the tubes are advanced seriatim, reciprocable indenting means operating in each station to form at least one groove, different stations grooving the tube at locations longitudinally spaced from one another, the tubes being advanced in step by step fashion from one station to another and being rotated in each station for forming of the groove or grooves.

This invention relates to machine tools, and particularly to machines for rolling circumferential grooves or beads in cylindrical tubes. Although not so limited, the invention has special reference to the beading of thin walled heat exchange tubes wherein the grooves, provided in longitudinal series, intermittently restrict fluid flow through a tube in a manner to raise the coefficient of heat transfer through the tube wall. It is important, in beading tubes, to form grooves of uniform, accurately controlled depth and spacing, irrespective of the material of the tubes, and to accomplish the beading in the most facile and expeditious manner possible.

It is the object of this invention to provide a machine to form grooves of a character and in a manner described, there being additionally achieved in carrying out the invention such speed and scope of operation as to produce completely formed tubes in production quantities.

Other objects and structural details of the invention will appear from the following description, when read in connection with the accompanying drawings, wherein:

FIG. 5 is a detailed vew, partly diagrammatic, showing elements involved in a tube beading operation, including support rolls, at adjacent beading stations;

FIG. 6 is a detail view of a blank tube, or one prior to beading;

FIG. 7 is a view of the tube of FIG. 6 after beading;

FIG. 8 is a fragmentary view, enlarged relative to FIG. 7, showing a bead formation in a tube;

FIG. 9 is a detail view of a cam, timing periods being diagramed thereon; and

FIG. 10 is a detail view in perspective of a transfer finger.

Figure 1:
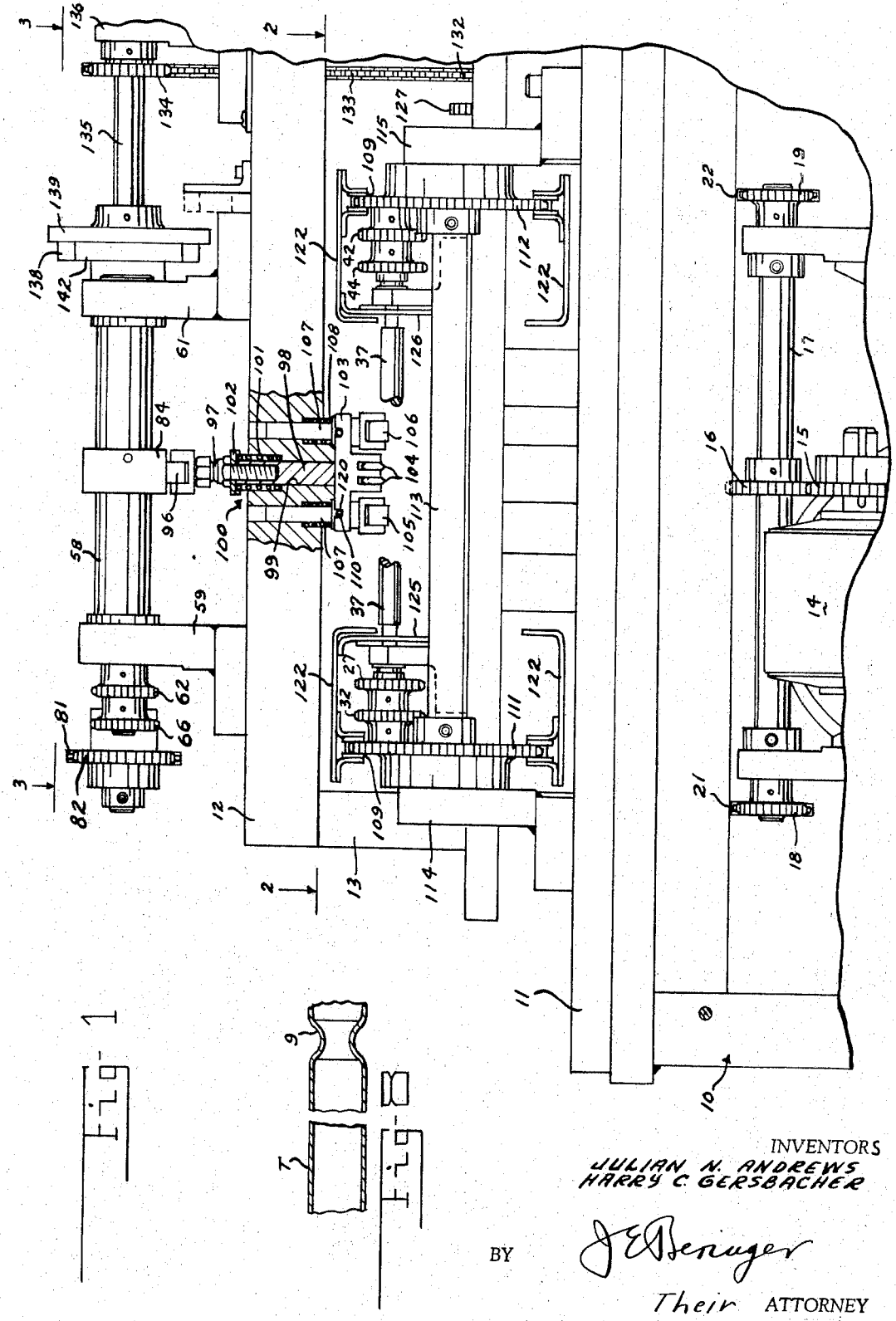
FIG. 1 is a fragmentary view in front end elevation of a machine in accordance with the illustrated embodiment of the invention, cover plates being removed and some elements being omitted for purposes of clarity.

Referring to the drawings, a machine in accordance with the illustrated embodiment of the invention advances tubes seriatim to and through sucessive tube beading stations. In each the tube has one or more complete annular grooves formed therein, different stations grooving the tube at different locations longitudinally thereof. Thus a blank tube, as the tube T in FIG. 6, is introduced at one end of the machine and progresses to the opposite end in a series of transfer steps, grooves being formed at each step and a completely beaded tube being discharged at the opposite end of the machine. The flow of tubes is continuous, with each station occupied by a tube in a state of completion appropriate to the station. A fully beaded tube appears as in FIG. 7, a predetermined length of the tube being occupied by longitudinally spaced apart annular grooves 9. The frame of the machine comprises a plurality of superposed frame elements (FIG. 1), the machine presenting mechanisms at underlying and overlying levels. Thus a base section is mounted on or supported by a base structure 10, an intermediate section is mounted on an intermediate plate 11 resting on the base structure 10 and a top section is mounted on a top plate 12 supported in an elevated relation to intermediate plate 11 by vertical framing 13.

In the base section 10 is power means 14 which through gears 15 and 16 rotatably drives a shaft 17. Secured to opposite ends of the shaft 17 are sprockets 18 and 19. Extending over the sprocket 18 and upward through the mounting plate 11 into the intermediate section is a chain 21. A like chain 22 extends over sprocket 19 and upward into the intermediate section.

Figure 2:
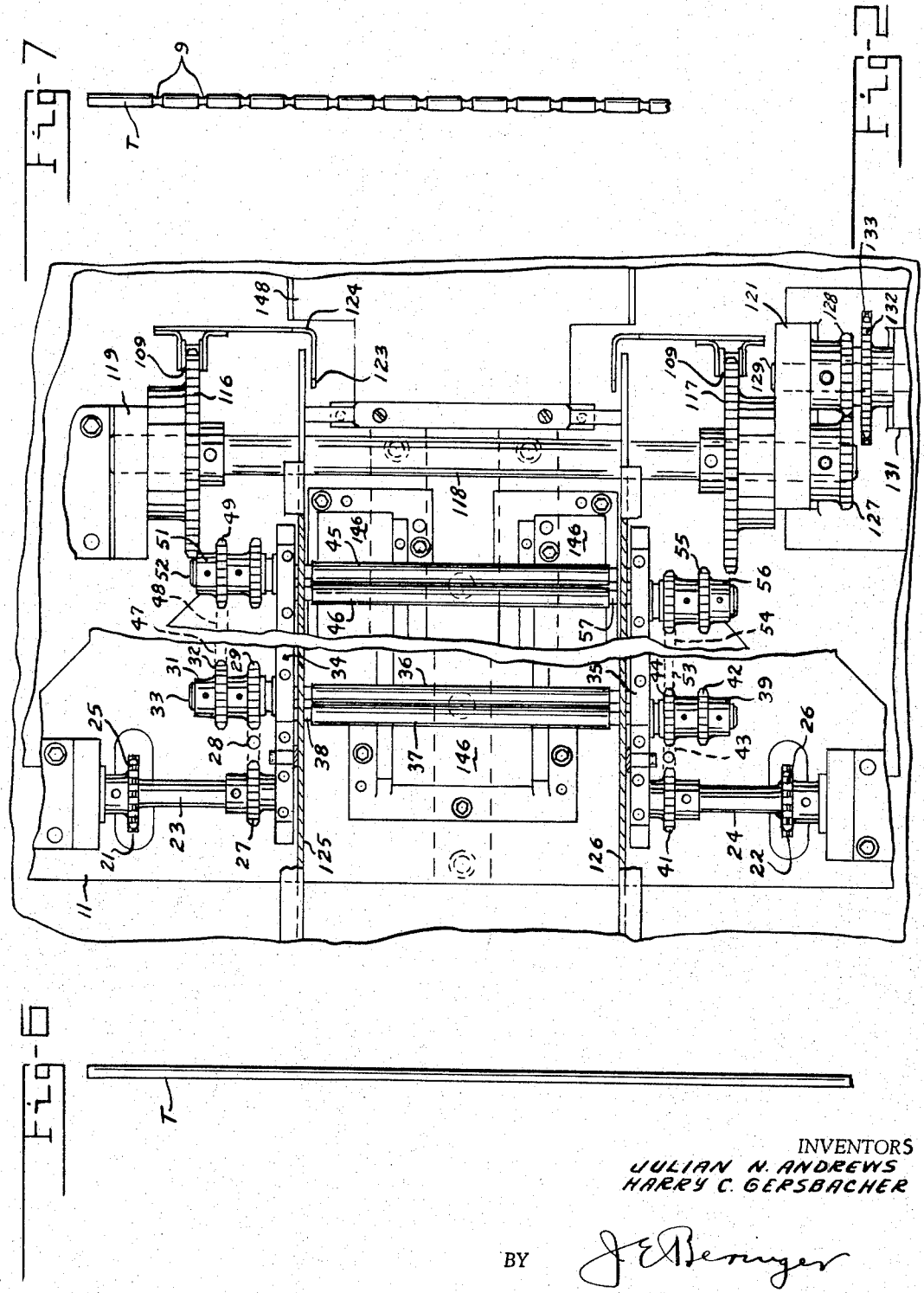
FIG. 2 is a plan view taken along an elevation as indicated at 2—2 of FIG. 1, being fragmentary in form and omitting some parts as in the case of FIG. 1.

As shown in FIG. 2, in the intermediate section, mounted on upstanding brackets on the plate 11, are laterally spaced apart aligned shafts 23 and 24. On the shaft 23 is a sprocket 25 over which chain 21 passes. A like sprocket 26 on shaft 24 has the chain 22 passed thereover. The shafts 23 and 24 are thus continuously driven from the power means 14. Also on the shaft 23 is a sprocket 27 which through a short length chain 28 drives an adjacent parallel sprocket 29. The latter is part of a sleeve 31 which further includes an aligned sprocket 32 and which is secured to one end of a shaft 33. The shaft 33 extends transversely of the machine and is journaled in spaced apart bearing block assemblies 34 and 35 which extend transversely of the machine and which further provide bearings for respective ends of the shafts 23 and 24. Between the bearing blocks 34 and 35, and secured to the shaft 33, is a long, smooth surfaced, cylindrical roller 36. The shaft and roller may be integral or unitarily connected as described. In parallel, closely adjacent relation to the roller 36 is a like roller 37 integral with or unitarily joined to a shaft 38. The latter is rotably mounted in the bearing blocks 34 and 35 and extends through and beyond the latter. On the projecting end thereof is a sleeve 39 on which are aligned sprockets 41 and 42. The former is connected by a short length of chain 43 to a sprocket 44 on the shaft 24. Thus the driving connection from the shaft 24 to shaft 38 and roller 37 is like that extending from shaft 23 to shaft 33 and roller 36. In consequence of the described connections the rollers 36 and 37 rotate continuousuly with energizing of the power means 14. The direction of rotation for both rollers is the same.

The rollers 36 and 37 represent, as will hereafter more clearly appear, a first tube beading station. Beyond it, toward the rear of the machine, is a series of longitudinally spaced apart, like stations terminating in a final pair of rollers 45 and 46. A driving connection as above described extends to and through the successive stations. Thus the sprocket 32 on sleeve 31 is connected by a short length of chain 47 to a mating sprocket mounted on a respective one of the next succeeding pair of rollershaft assemblies, the driving connections on that side of the machine terminating in a chain 48 in driving connection with a sprocket 49 on a sleeve 51, such sleeve being fast on a shaft 52 forming an integral part of or to which the roller 45 is secured. In like manner the spocket 42 on sleeve 39 drives a chain 53 extending to the other shaft-roller assembly of the next succeeding station, this drive terminating in a chain 54 driving a sprocket 55 on a sleeve 56 secured to a shaft 57 to which roller 46 is secured. As a result of the described construction and arrangement of parts all of the rollers 36–46 are in continuous rotary movement in the operation of the machine. A tube for beading is received in each beading station by lying on and between the pair of rollers defining such station to be mutually supported thereby, the tube tending on account of the rotation of the rollers to rotate about its own axis. As received in the initial tube beading station, as represented by the rollers 36 and 37, the tube is blank, as indicated in FIG. 6. Leaving the final station as represented by the rollers 45 and 46, the tube is competely beaded as shown in FIG. 7.

Figure 3:
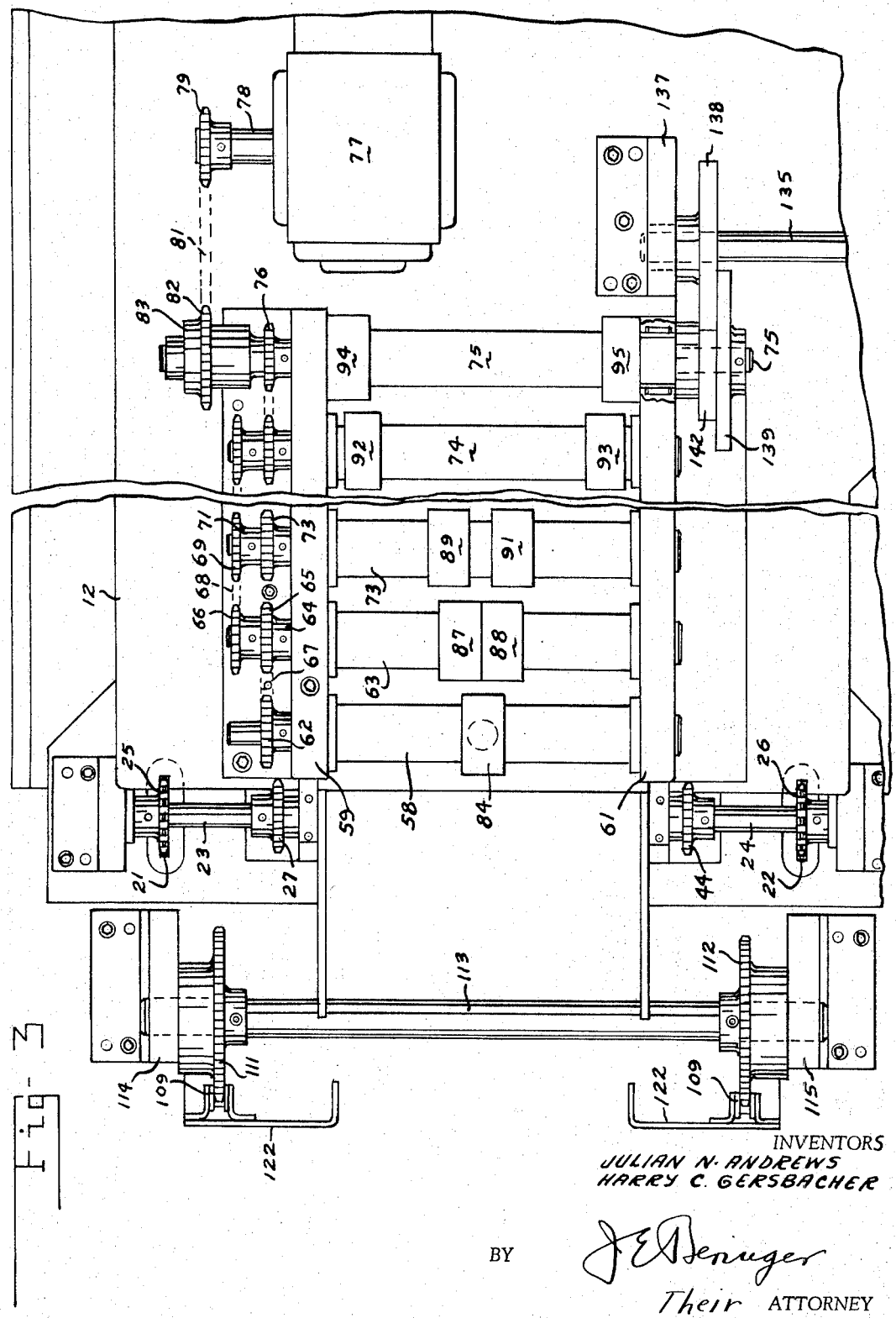
FIG. 3 is a view like FIG. 2 taken at a relatively higher elevation, as indicated at 3—3 of FIG. 1.

Referring to FIG. 3, in overlying relation to the rollers 36 and 37, and forming a part of the initial tube beading station, is a transverse shaft 58 journaled at its ends in bearing blocks 59 and 61 upstanding from the mounting plate 12. The shaft 58 is reduced in diameter beyond the bearing block 59 and has a sprocket 62 made fast thereto. At the second or next succeeding tube beading station is an overlying shaft 63 on a projecting end of which is mounted a sleeve 64. Aligned sprockets 65 and 66 are on the sleeve 64, the former being connected by a short length of chain 67 to the sprocket 62. Similarly the sprocket 66 is connected by short length of chain 68 to a sprocket 69 on a sleeve 71 secured to a shaft 72 in overlying relation to the third beading station. In like manner another aligned sprocket 73 on the sleeve 71 is in a connected relation to like structure at the next succeeding station, the connections being continuous to and through the final two shafts 74 and 75, the latter having a terminal sprocket 76 thereon.

The foregoing mechanism comprising the transverse, overlying shafts 58 and the others is rotatably driven from an individual power means 77. A shaft 78 extending therefrom has a sprocket 79 thereon which through a chain 81 drives a sprocket 82 on a sleeve 83, the latter being fast on the shaft 75 and incorporating also the aforementioned sprocket 76. Operation of the power means 77 accordingly positively rotates shaft 75 and through the described train of sprockets and chains beginning with sprocket 76 and ending with sprocket 62 simultaneously rotates the shaft 58 and all the other like shafts disposed in series between it and shaft 75.

The several described overlying shafts 58 and the others each have cam means thereon responsive to rotation of the shafts to operate tube pressing and indenting means. Thus, midway along the shaft 58 is a cam 84. The surface or profile of the cam 84 is such as to provide relatively high and low portions 85 and 86 (FIG. 9) achieving a timed, progressive indenting and release of a tube as will hereinafter more clearly appear. At the second or next succeeding station is a pair of cams 87 and 88 in side by side relation. At the next succeeding or third station is a pair of cams 89 and 91 similarly in side by side relation but more widely spaced than the cams 87 and 88. This relationship continues throughout the series of tube beading stations, each station providing a pair of cams on a respective overlying shaft, each pair of cams being somewhat more widely spaced apart than the pair of cams of the preceding station. The series of cams terminates near its end in relatively widely spaced cams 92 and 93 on the shaft 74 and in a final pair of the most widely spaced cams 94 and 95 on the shaft 75. All of the described cams are identical in their construction and are identically positioned on their respective shafts to achieve simultaneous indenting and releasing results.

Riding the surface of each cam 84 and the others, in a following relation thereto, is a roller 96 (FIG. 1) mounted in the bifurcated upper end of a rod 97 vertically mounted in each tube beading station to extend perpendicularly between an overlying shaft 58 or the like and an underlying pair of cylindrical rollers 36–37 or the like. Each rod 97 has a telescoping, threaded connection in a stud 98 slidably received in a through bore 99 in the plate 12. The roller 96 and rod 97 are parts of a tube pressing and indenting assembly 100 mounted for vertical sliding motion in the frame plate 12. A compression spring 101 is seated in a counterbore in the upper part of bore 99 and presses against a collar 102 adjustably positioned on the rod 97 above the stud 98. The rod 97 and associated parts is in this manner urged upward to maintain the roller 96 in contact with the cam, as the cam 84 in the illustrated instance. The stud 98 extends below the plate 12 and on its lower projecting end carries a laterally elongated carriage member 103. At its midpoint the carriage 103 mounts a pair of disc elements 104 in side by side relation, and, at its ends, supports rollers 105 and 106. Each of the latter is attached to one end of a stud 107 slidable in the carriage 103 and having a projected, reduced diameter portion received in a bore in plate 12. A spring 108 is recessed in plate 12 and urges the stud 107 downwardly or outwardly. A pin 110 in the stud mounts in a slot 120 in the carriage 103 to limit such motion.

The assembly 100 accordingly moves vertically toward and away from the underlying tube supporting cylindrical rollers in response to rotation of an overlying cam, moving positively downward as the roller 96 encounters the high portion 85 of the cam and retracting upward under urging of the spring 101 as low portion 86 of the cam is presented to the roller 96.

The elements 104 are indenting devices. They are circular or disc-like in shape rotatably mounted in a central projecting portion of the carriage 103 and having relatively sharp edged peripheries, with flat sides of the disc tapering gradually to the periphery. The carriage 103 is positioned to lie in the plane of a tube supported by and between the underlying pair of cylindrical rollers, as the rollers 36–37, with the elements 104 located to dispose their peripheral edges in planes at right angles to the axis of the tube. As a result, when the carriage 103 descends, the elements 104 engage the tube, and, under continuing applied pressure by the cam, indent the tube, forming grooves at right angles to the tube axis. Further, in engaging and pressing upon the tube, the elements 104 press the tube firmly to a seat upon the supporting cylindrical rollers and this action is assisted by the rollers 105 and 106 which engage the tube at about the same time or slightly prior to its engagement by elements 104. By reason of this applied pressure, and on account of the positive rotary motion of the supporting cylindrical rollers, the tube rotates about its axis. This motion, taken with the indenting pressure of the elements 104, forms or rolls a continuous groove or bead in the tube throughout the circumference thereof.

As indicated, there is an assembly 100 for each cam 84 and the others. While each carriage 103 may have two roller elements 104 as indicated, or some larger number, the carriage devices beyond the initial one illustrated in FIG. 1 each mount but a single roller element. According to the construction and arrangement of parts, therefore, at the initial station a pair of grooves is formed at the center of the tube. At succeeding stations two additional grooves are formed, one outwardly or at each end of the grooves formed at the immediately preceding station. Carriage devices beyond the initial device 103 may have both pressure rolls 105 and 106. However, inasmuch as there are two devices 103 at each station, beyond the initial station, a single presure roll on each device may suffice.

As previously indicated, the cam 84 and the others are identically positioned upon their respective shafts. As a result all of the several assemblies 100 are simultaneously extended and retracted. The period of retraction is used for a simultaneous transfer or progression of the tubes from one station to a succeeding station. The transfer means is in the form of conveyor chains 109 (FIGS. 1-4) which extend in laterally spaced relation longitudinally through the intermediate section of the machine across the opposite ends of the cylindrical tube supporting rollers 36-37 and the others. At the front end of the machine are sprockets 111 and 112 over which the chains 109 are engaged, these sprockets being fast on a shaft 113 journaled in bearing blocks 114 and 115. At the rear of the machine like sprockets 116 and 117 engage the chains 109 and are mounted on a shaft 118 supported in bearing blocks 119 and 121.

Fixed to each conveyor chain 109 is a longitudinal series of transfer fingers 122 (see also FIG. 10). Each finger extends laterally toward the center of the machine and has a turned over extremity 123 in which is a slot 124, the slot extending upwardly through the bent portion of the finger to occupy a part of the main body thereof. The bottom of the slot is closed, this being done in the illustrated instance for manufacturing convenience by mounting a strap 130 on the outer end of extremity 123. Accordingly, a tube may be dropped vertically into a slot 124 until its end comes to rest in the bottom of the slot on the strap 130. The fingers 122 are arranged in corresponding number and position on the respective chains so that an opposed pair of fingers may cooperate in receiving and supporting opposite ends of a single tube. The slots 124 are shaped to permit vertical bodily movement of the tube relative to the fingers without, however, permitting any substantial amount of relative motion forwardly or rearwardly of the machine. With a pair of opposing transfer fingers 122 located in a tube indenting station the tube carried thereby is free to assume a position of rest upon the supporting cylindrical rollers as described. At the end of the tube beading portion of an operating cycle, however, upon retraction of the assemblies 100, the fingers 122 are enabled to move longitudinally of the machine in an indexing operation carrying the tubes from one bending station to the next succeeding station. In the process the tubes may ride over the supporting rollers or be otherwise elevated from their nested position therebetween with such motion being accommodated in the transfer fingers by the slots 124. Upstanding guides 125 and 126 support the outer ends of the fingers 122, with the bent over extremities thereof extending downward in adjacent relation to the supporting guides and immediately above the reduced ends of the cylindrical rollers.

Figure 4:
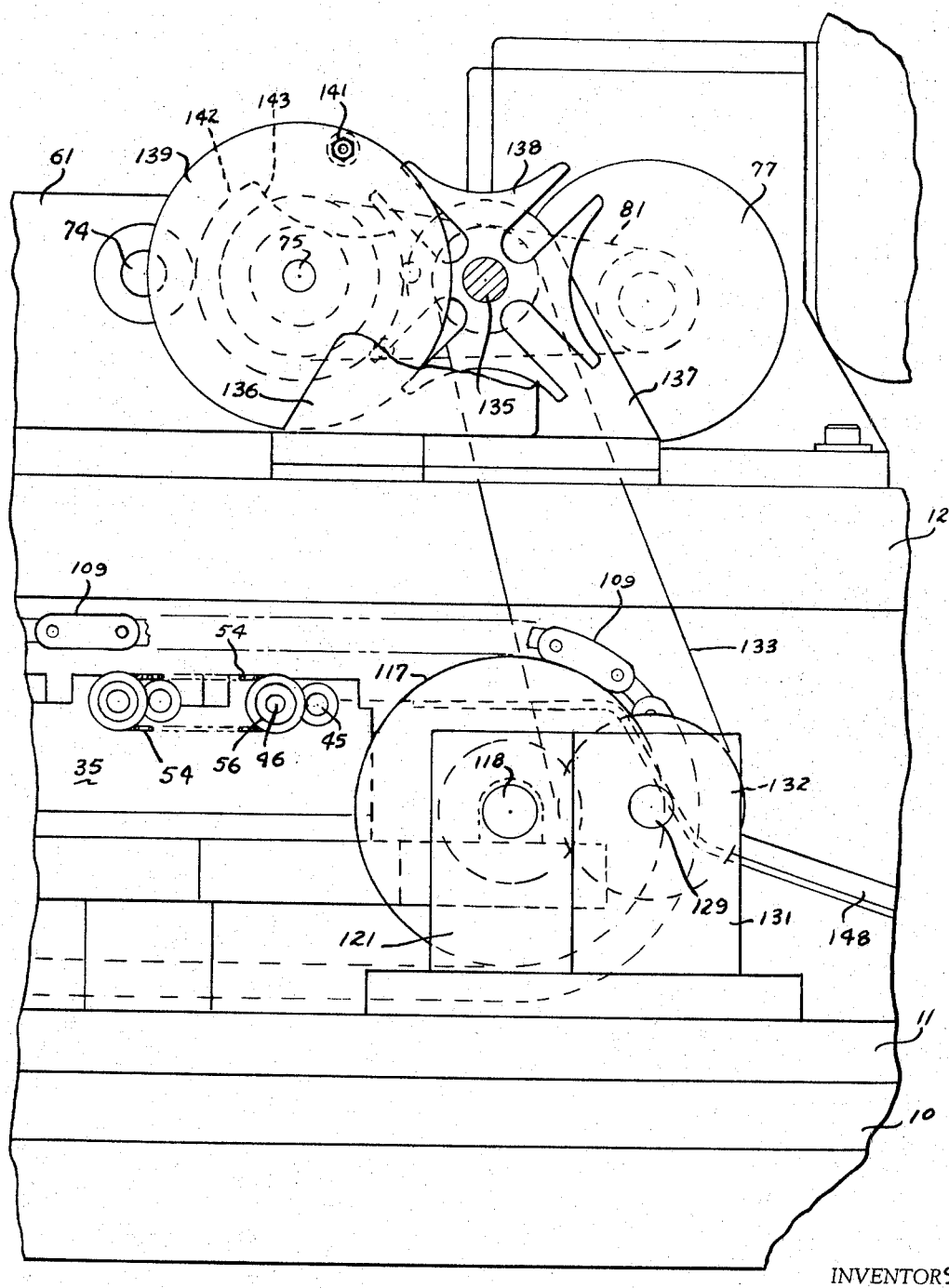
FIG. 4 is a fragmentary, detail view in side elevation, showing the timed driving connections between tube indenting means and tube conveying means.

The indexing of transfer fingers 122 is in accompaniment with advance of the chains 109 to which they are secured. The latter in turn have an intermittent, step by step, movement coordinated with descent and withdrawal of the assemblies 100. In effecting this driving operation the shaft 118, to which sprockets 116 and 117 are secured, is extended through and beyond bearing block 121 and has a gear 127 thereon (FIG. 2). The gear 127 meshes with another gear 128 mounted to a shaft 129 having end bearings in the block 121 and another laterally spaced bearing block 131. Also fast to the shaft 129 is a sprocket 132 over which is engaged a chain 133. The latter extends upwardly through an opening in the plate 12 from the intermediate section of the machine to the top section where it is engaged over another sprocket 134 on a shaft 135 (FIGS. 1 and 4). The latter is journaled at its one end in a bearing block 136 and at its other end in a bearing block 137, both mounted on the plate 12. On the shaft 135 is a Geneva gear 138. In a plane immediately adjacent to the Geneva gear 138 is a disc 139 secured to the previously mentioned cam shaft 75. The disc 139 has a projecting stud 141 (FIG. 4) thereon adapted to enter successive slots in the Geneva gear to effect a partial turning movement thereof once during each revolution of the disc 139, in accordance with the usual operation of Geneva mechanisms. A hub 142 on the disc 139 is aligned with the gear 138 and is curved to interfit with recessed portions of the periphery of the gear whereby to hold the gear and connected parts against motion except when operated by the stud 141. A cutout portion 143 of the hub 142 permits actuated motion of the Geneva gear. The cam shaft 75 is continuously driven from the power source 77 in the operation of the machine. Once each revolution of the shaft, and of the disc 139 mounted thereon, the Geneva gear 138 and its connected parts are advanced an increment of movement resulting in indexing of the conveyor chains 109 and mounted transfer fingers 122 as described.

The pressure applied by the disc elements 104 to the tube and through it to the cylindrical rollers on which they rest is substantial, the machine being adapted for the beading of tubes made of steel as well as of the lighter weight metals. According to a feature of the invention, the load stresses are distributed and confined in a unique manner maintaining alignment of the parts and prolonging the life thereof. Underlying each pair of cylindrical rollers, and referring to rollers 36-37 by way of example, is a relatively heavy support roll 144 (FIG. 5) having its axis in line with the axis of a supported tube T and in common contact with the rollers 36 and 37. Support roll 144 is suitably mounted in bearing blocks 145 on base plate 11. On each side of support roll 144, and elevated relatively thereto, is another support roll 146, there being a roll 146 between each tube beading station. Bearing blocks 147 mount the support roll 146 for rotary motion. The surface of each roll 146 is spaced from the surface of support roll 144 but is in contacting relation to a tube supporting roller 36 or 37. The vertical position of the roll 146 is such as to place its center somewhat above an imaginary line drawn through the tube axis and through the axis of the respective supporting rollers 36 or 37. The reactant thrust exerted by the rolls 146 accordingly is such as to contain or confine the rollers 36 and 37, forcing them to a seat on underlying roller 144 and obviating lateral displacement thereof. The support rolls 144 and 146 may be coextensive in length with the rollers 36 or 37 or they may be short length elements provided to support the rollers only at the location of the bead forming discs 104. In the latter event there would in the majority of beading stations be two sets of support rolls, one for each assembly 100. As indicated, each roll 146 is common to two adjacent beading stations. Thus a single roll 146 contacts a tube supporting roller 36 or 36a of one station and a tube supporting roller 37 or 37a of the next succeeding station.

In the operation of the machine, blank tubes are fed seriatim to the initial tube beading station and this will ordinarily be done automatically by a feeding mechanism operated in a timed relation to other machine operations. Insofar as the present invention is concerned, however, the tubes may be placed by hand in the first beading station on cylindrical rollers 36 and 37, so that no tube feeding devices are here illustrated.

The blank tube is placed in position on the rollers 36 and 37, being dropped in a slot 124 in an aligned finger 122, while the cam 84 is in a position allowing assembly 100 to assume an elevated position under the urging of spring 101. Upon the next descent of the assembly, therefore, the beading discs 104 find a tube disposed on the underlying rollers and indent the tube, the tube rotating in consequence of rotation of the underlying rollers and of pressure exerted by the rollers 105 and 106 so that the indentation of the tube is continuous about the circumference thereof. Upon retraction of the assembly 100, the tube is left with a pair of longitudinally spaced annular grooves therein. Now the tube is advanced by the transfer fingers 122 to the next succeeding beading station while a new tube is introduced into the initial station. Upon the following descent of the assemblies 100 in the first and second stations, therefore, the tubes therein are simultaneously beaded, the tube in the initial station being grooved as before described and the tube in the second station having two additional grooves formed therein, one on each side of the previously formed pair. As the assemblies 100 again retract, the transfer fingers 122 move the tubes to subsequent stations and still another tube is introduced into the initial station. The beading operations as described continue in this manner with the leading tube being progressively beaded at the different stations until finally discharged from the machine. In this regard it will be observed from FIG. 2 that the transfer fingers 122 turn at the rear of the machine and assume an inverted position as they travel back to the front of the machine. In the turning motion, the finished tube is allowed to drop out of the grooves 124 into a tray 148.

The cams effecting the beading operations have been described as each having a high portion 85 and a low portion 86. It will be understood, however, that each cam is formed in a suitable progression, and at an appropriate time in relation to other machine operations, its function of extending an asesmbly 100 and controlling the retraction thereof. Thus as indicated in the enlarged view of FIG. 9, when the roller 96 drops off the high portion 85 of the cam the assembly 100 raises or retracts during a period of rotation of the cam of approximately 30°. In a succeeding period of approximately 90° the assembly 100 dwells in an elevated or retracted position and in this period the transfer fingers 122 are in operation to advance the tubes to next succeeding beading stations. A next or "Advance" period of approximately 36° brings the high portion 85 of the cam again into cooperative relation with the roller 96 and in the process advances or projects downward the assembly 100 in a manner to place its beading discs 104 and pressure rolls 105 and 106 into contact with an encountered tube. In a following or "Feed" phase of rotation, amounting approximately to 190° of rotation of the cam the beading elements 104 are caused progressively to indent the tube, achieving a maximum depth of indentation at the end of this phase or at a point approximately 13° from the end of high portion 85. In this latter period, the cam dwells.

The speed of rotation of the cam shafts is related in a predetermined manner to the speed of rotation of the support rollers 36–37 and the others. In such relationship it is provided that the rotation of the held tube about its axis during the grooving operation shall be such that the tube will complete at least one full revolution in the 13° dwell period at the end of the grooving phase. As a result, the depth of the formed groove is uniform. The movement of the assemblies 100 in the "Feed" period or phase of cam movement is predetermined as to extent to achieve the desired depth of grooving. This, in turn, is a function of the desired extent of restriction to fluid flow, as well as of the character of the metal of which the tube is made. In the illustrated instance, as indicated in FIG. 5, the depth of grooving is such as to achieve a depth of groove of approximately 1/16" in a 1/8" diameter tube, the extent of penetration being indicated by dotted lines. It is a feature of the invention that the depth of grooving may be varied by adjusting rod 97 in stud 98 or interchanging the actuating cams. The formed groove 9, as shown in FIG. 8, has sloping interior and exterior sides. It restricts flow through the tube to a passage of reduced area at the center of the tube, achieving at the location of the groove succeeding constriction and expansion functions producing a desired flow turbulence.

What is claimed is:

1. A machine for forming longitudinally spaced apart circumferential beads in a cylindrical tube, including means defining a series of tube beading stations, conveyor means for advancing tubes seriatim to successive stations, and means operable simultaneously in all said stations for forming at least one continuous circumferential groove in a tube at each of said stations, each station grooving a tube at locations longitudinally spaced from grooves formed in said tube at preceding and succeeding stations.

2. A machine for forming longitudinally spaced apart circumferential beads in a cylindrical tube, including means defining a series of tube beading stations, means for advancing a tube to successive stations, reciprocable tube indenting means at each station, different stations indenting said tube at locations longitudinally spaced from one another, rotary cam means for advancing said indenting means upon a tube and for controlling its withdrawal therefrom, said cam means being formed to provide a dwell in a position of maximum advance of said indenting means, and means for rotating said tube in each station whereby said indenting means forms a continuous groove in the tube, said last named means having such timed relation to the rotation of said cam means as to cause said tube to complete at least one full revolution in the period of dwell of said cam means.

3. A machine for forming longitudinally spaced apart circumferential beads in a cylindrical tube, including means defining a series of tube beading stations, there being in each of said stations a pair of rotatable rollers in side by side relation, the tube being received between and resting on said rollers, overhead means adapted to descend on and press said tube to a seat on said rollers, means for rotating said rollers whereby in conjunction with said overhead means to rotate said tube, and tube indenting means comprised in said overhead means adapted to engage and deform a short segment of said tube, rotation of the tube resulting in formation of a continuous circumferential groove therein by said last named means.

4. A machine according to claim 3, characterized in that said overhead means is provided in each of said stations, different stations providing for the indenting of said tube at different longitudinal locations therealong.

5. A machine according to claim 3, characterized by other rotatable rolls in underlying, contacting relation to said pair of rollers absorbing the thrust of said overhead means.

6. A machine for beading cylindrical tubes, including a beading station providing a pair of rotatable rollers in side by side relation, the tube being received between and resting on said rollers, overhead means adapted to descend on said tube urging it to a seat on said rollers and applying a localized indenting pressure thereto, rotation of said rollers rotating said tube to form a continuous groove in said tube, a rotatable support roll underlying said pair of rollers and in common contact therewith, and other support rolls one on each side of said first mentioned support roll and in contact with a respective one of said pair of rotatable rollers, said support rolls absorbing the thrust applied by said overhead means.

7. A machine according to claim 6, characterized in that said other support rolls are each positioned with its center elevated relative to a line drawn through the centers of said tube and a contacted one of said rotatable rollers.

8. A machine for beading cylindrical tubes, including a beading station providing a pair of rotatable rollers in side by side relation, the tube being received between and resting on said rollers, a laterally spaced apart pair of support rolls in generally underlying relation to said pair of rotatable rollers, each support roll having its surface in contact with the surface of respective one of said pair of rotatable rollers, said support rolls being positioned to place their centers above a line drawn through the center of a respective one of said pair of rotatable rollers and through the center of a supported tube.

9. A machine for forming longitudinally spaced apart circumferential beads in a cylindrical tube, including means defining a series of tube beading stations, means for advancing a tube to successive stations, each station comprising a pair of rotatable rollers in side by side relation, a tube being received between and resting on said rollers, overhead means at each station adapted to descend on and indent a received tube, said overhead means having advancing and retracting motions, rotation of said rollers turning a received tube to cause a continuous circumferential grooving of the tube, said overhead means at different stations being differentially positioned whereby advance of a tube to and through successive stations will effect a progressive complete beading thereof, and means operating in a timed relation to said overhead means for advancing said tubes seriatim to and through said stations.

10. A machine according to claim 9, characterized in that said last named means comprises continuous conveyor means, means effecting incremental advance of said conveyor means, and transfer fingers carried by said conveyor means, said fingers having each a vertically elongated slot receiving a tube and accommodating vertical movement of said tube in passing over said rollers.

11. A machine for forming longitudinally spaced apart circumferential beads in a cylindrical tube, including means defining a series of tube beading stations, means for advancing a tube to successive stations, each station comprising a pair of rotatable rollers in side by side relation, a tube being received between and resting on said rollers, said stations being disposed in longitudinally spaced relation to one another with adjacent pairs of rotatable rollers parallel to one another, said tube advancing means including conveyor means movable along side said stations at opposite ends of said pairs of rollers, transfer fingers paired by said conveyor means, each being slotted to receive an end of a tube, said fingers carrying said tubes to and through successive stations, the slots in said fingers being elongated to allow said tube ends to rise and fall therein as said tubes ride over said rotatable rollers, and means for grooving said tubes in each of said stations.

12. A machine according to claim 11, characterized in that said last named means comprises overhead means adapted to descend and withdraw in advancing and retracting strokes relative to said stations, each said overhead means including pressure means to engage and urge a tube to a seat on said rollers and further including indenting means to engage and deform a tube, rotation of said rollers accomplishing in conjunction with said overhead means rotation of said tubes and complete circumferential grooving thereof by said indenting means.

13. A machine for beading cylindrical tubes, including a beading station providing a pair of rotatable rollers in side by side relation, the tube being received between and resting on said rollers, overhead means movable toward and from a received tube in advancing and retracting strokes, said overhead means comprising pressure means operable during a part of the advancing stroke to engage and urge said tube to a seat on said rollers and further comprising indenting means engaging and deforming said tube during another and later part of the advancing stroke, means for rotating said rollers whereby in conjunction with said pressure means to rotate said tube, said indenting means comprising a disc-like element having a peripheral beading edge disposed transversely of the tube axis whereby to roll a continuous circumferential groove in said tube in response to rotation of said tube, and a rotatable cam for moving said overhead means through said advancing and retracting strokes, said cam having a dwell portion maintaining said overhead means in a maximum advanced position for a period in which said tube turns through at least one full revolution.

14. A machine for beading cylindrical tubes, including a beading station providing a pair of rotatable rollers in side by side relation, the tube being received between and resting on said rollers, overhead means movable toward and from a received tube in advancing and retracting strokes, said overhead means comprising pressure means operable during a part of the advancing stroke to engage and urge said tube to a seat on said rollers and further comprising indenting means engaging and deforming said tube during another and later part of the advancing stroke, means for rotating said rollers whereby in conjunction with said pressure means to rotate said tube, said indenting means comprising a disc-like element having a peripheral beading edge disposed transversely of the tube axis whereby to roll a continuous circumferential groove in said tube in response to rotation of said tube, a series of like beading stations and respective overhead means being provided, and means for transferring a tube between successive stations in a timed relation to the movement of said overhead means.

15. A machine for forming longitudinally spaced apart circumferential beads in a cylindrical tube, including means defining a series of tube beading stations, reciprocable indenting means operable simultaneously in all said stations to form at least one continuous circumferential groove in a tube at each of said stations, each station grooving a tube at locations longitudinally spaced from grooves formed at preceding and succeeding stations, continuously operating means for reciprocating said indenting means, conveyor means for advancing tubes seriatim to successive stations, and a drive from said continuously operating means to said conveyor means effecting movement of said conveyor means in step by step fashion in a timed relation to reciprocation of said indenting means.

References Cited

UNITED STATES PATENTS

| 1,932,271 | 10/1933 | Hughes et al. | 29—516 |
| 2,661,526 | 12/1953 | Bruegger | 29—157.3 |
| 3,299,680 | 1/1967 | Thompson | 72—6 |

FOREIGN PATENTS

| 343,967 | 2/1931 | Great Britain. |

CHARLES W. LANHAM, *Primary Examiner.*

H. D. HOINKES, *Assistant Examiner.*